April 23, 1957     R. A. SICHO     2,790,144
A.C.-D.C. TESTING DEVICE
Filed Aug. 31, 1953
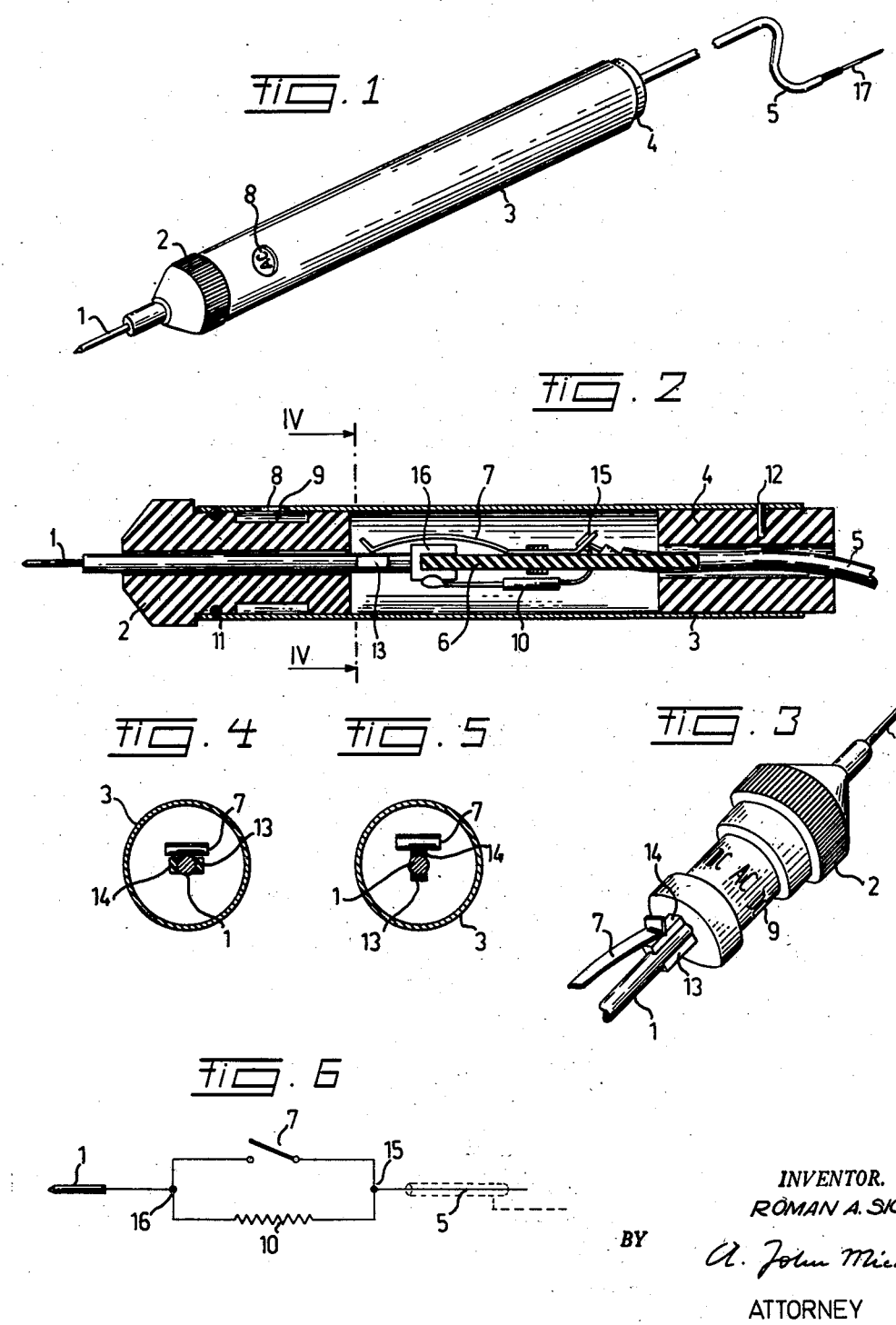
INVENTOR.
ROMAN A. SICHO
BY
ATTORNEY

United States Patent Office 2,790,144
Patented Apr. 23, 1957

2,790,144

A. C.-D. C. TESTING DEVICE

Roman A. Sicho, Elmhurst, N. Y., assignor to Electronic Instrument Co., Inc.

Application August 31, 1953, Serial No. 377,355

8 Claims. (Cl. 324—72.5)

My present invention relates to improvements in testing devices or probes for electric circuits requiring the use of more than one type of source of electric energy, such as sources of alternating and of direct current.

Particularly where the testing device is designed to cooperate with a highly sensitive measuring instrument, such as a vacuum tube voltmeter or the like, it is preferable to have the resistor in the probe rather than in the instrument in order to reduce contact potential and to reduce pickup; it is also necessary to adapt the impedance of a probe to that of the circuit to be tested, in order not to overload the meter. The impedance of the circuit to be tested, however, will in many instances be different for alternating and for direct current, being usually larger in the former case. It has, therefore, been the practice to provide two separate probes for testing with A. C. and D. C. current sources, respectively, the D. C. probe incorporating an additional resistance to compensate for the aforementioned difference in circuit impedance. The use of two probes entails, of course, considerable inconvenience, delay and expense.

It is, accordingly, an object of my present invention to provide a testing device of the aforementioned character having means for quickly and easily converting it from a probe suitable for one type of electric energy (e. g. direct current) into a probe adapted to be used with another type of electric energy (e. g. alternating current) and vice versa.

It is another object of this invention to provide a convertible probe as set forth in which reversible switch means adapted to effect the conversion are coupled with means for positively indicating to the user the condition in which the device has been placed, thereby obviating the risk of using the probe in combination with a source of current to which it has not been adjusted.

A further object of the invention is to provide reversible switch means, for the purpose indicated above, so positioned as to occupy a minimum of space and to be readily accessible for operation without unduly increasing the bulk of the probe.

The foregoing objects are realized, in accordance with a feature of my invention, by the provision of a rotary switch member which concentrically surrounds the fixed contact electrode of the probe and carries markings selectively displayed through a window in the tubular probe housing, these markings indicating whether the switch member, by its operation, has conditioned the probe for, say, A. C. or D. C. testing.

The above and other objects and features of this invention will become more fully apparent from the following description of a now preferred embodiment, reference being had to the accompanying drawing in which:

Fig. 1 is a perspective view of a testing device according to the invention;

Fig. 2 is an axial section through the tubular housing of the probe proper;

Fig. 3 is a perspective view of the switch member and associated parts removed from the housing;

Fig. 4 is a section taken on the line IV—IV of Fig. 2, illustrating the AC position of my device;

Fig. 5 is a section similar to Fig. 4 but illustrating the DC position of my device; and Fig. 6 is a circuit diagram of the testing device shown in Fig. 1.

The testing device shown in the drawing, whose elements have been uniformly designated throughout the several views, comprises a contact electrode or probe tip 1 projecting from one end of a tubular housing 3. A lead wire 5, projecting from the opposite end of the housing 3, is connected to another tip 17 adapted to engage a terminal of a voltmeter, current source etc. (not shown).

Insulated lead wire 5 is secured to the housing 3 by means of an insulating plug 4 which is immobilized with respect to the housing by a pin 12. At 15 there is shown within the housing a junction between an extremity of wire 5, an end of a contact spring 7 and a terminal of a resistor 10 whose other terminal is joined at 16 to contact electrode 1. A mounting board 6, internally supported by the wall of housing 3, serves as an insulating base for the elements 1, 5, 7 and 10.

Rotatably held within the housing 3 opposite plug 4, by means of retaining ring 11, is a knurled or milled head 2 serving as a control member for the switch represented by contact spring 7 and electrode 1. Head 2, concentrically surrounds the electrode 1 and on its inner end bears two insulating projections 13, 14 lying in one plane with this electrode. As best seen in Fig. 4, head 2 has two diametrically opposite positions in which the projections 13, 14 are substantially flush with electrode 1 and allow the same to come in contact with spring 7, corresponding to the closed position of the switch shown at 7 in Fig. 6; and, as best seen in Fig. 5, head 2 also has two diametrically opposite positions in quadrature with the aforementioned ones in which contact spring 7 is held out of engagement with electrode 1 by either one of the two projections 13, 14. A reduced portion of head 2 bears a scale 9 comprising the markings "AC" and "DC", Fig. 3, visible through a window 8 in housing 3 when the head is in the position of Figs. 4 and 5, respectively.

It will thus be apparent that in the "AC" position of head 2 (Figs. 2 and 4) the switch 1, 7 effectively shunts the resistor 10, thereby reducing the internal resistance of the device and adapting it for use in series with an A. C. source; conversely, in the "DC" position of head 2 (Fig. 5) the switch is open, as also illustrated in the diagram of Fig. 6, whereby resistor 10 is effectively in circuit and the device can be used in series with a D. C. source. It will be apparent, however, that according to the broader aspects of the invention it is possible to replace the resistor 10 by some other impedance if use of the device for purposes other than those specifically outlined is desired; the invention, accordingly, is not limited to the particular arrangement described and illustrated by may be embodied in various modifications and adaptations without departing from the spirit and scope of the appended claims.

I claim:

1. An electric testing device comprising an elongated contact electrode, a tubular housing surrounding said electrode, a control member rotatably held in said housing and concentrically surrounding said electrode, impedance means within said housing, conductor means extending from said housing, switch means in said housing for selectively connecting said impedance means in circuit with said electrode and said conductor means and for effectively removing said impedance means from said circuit, and means including said control member for operating said switch means.

2. A device according to claim 1, wherein said switch means comprises a contact element adapted to engage said electrode, said control member being provided with actuating means for removing said contact element from said electrode in a selected position of said control member.

3. A device according to claim 1, wherein said control member is provided with indicator means, said housing being provided with a formation cooperating with said indicator means to indicate the instantaneous position of said switch means.

4. An electric testing device comprising a tubular housing, an elongated contact electrode projecting from one end of said housing, a head concentrically surrounding said electrode and rotatably held in said one end of said housing, said electrode having a portion extending beyond said head within said housing, a conductor entering said housing from the other end, a contact spring conductively connected to said conductor and resiliently urged into conductive contact with said extending portion of said electrode, resistor means connected between said extending portion and said conductor, and at least one projection on said head positioned alongside said extending portion and adapted to break contact between said electrode and said spring in one position of said head while allowing such contact in another position of said head.

5. A device according to claim 4, wherein said head is provided with a first marking visible through a cutout in the housing in said one position and with a second marking visible through said cutout in said other position of said head.

6. An electric testing device comprising an elongated contact electrode, a tubular housing surrounding said electrode, a control member rotatably held in said housing and concentrically surrounding said electrode, impedance means within said housing, conductor means extending from said housing, switch means in said housing for selectively connecting said impedance means in circuit with said electrode and said conductor means and for effectively removing said impedance means from said circuit, said switch means comprising a spring conductively connected to said conductor means and resiliently urged toward said electrode, and said control member being provided with actuating means for removing said spring from said electrode in a selected position of said control member.

7. An electric testing device comprising an elongated contact electrode, a tubular housing surrounding said electrode, a control member rotatably held in said housing and concentrically surrounding said electrode, impedance means within said housing, conductor means extending from said housing, switch means in said housing for selectively connecting said impedance means in circuit with said electrode and said conductor means and for effectively removing said impedance means from said circuit, said switch means comprising a contact element adapted to engage said electrode, and said control member being provided with a pair of projections straddling said electrode and interposing themselves between said electrode and said contact element in respective selected positions of said control member yet lying parallel to the surface of said contact element in other positions of said control member.

8. An electric testing device comprising an elongated contact electrode, a tubular housing surrounding said electrode, a control member rotatably held in said housing and concentrically surrounding said electrode, said control member being provided with a plurality of indicator markings selectively viewable through a cutout in said housing, impedance means within said housing, conductor means extending from said housing, switch means in said housing for selectively connecting said impedance means in circuit with said electrode and conductor means and for effectively removing said impedance means from said circuit, and means including said control member for operating said switch means.

References Cited in the file of this patent

UNITED STATES PATENTS

| 1,560,278 | Mahan | Nov. 3, 1925 |
| 1,707,051 | Colosoff | Mar. 26, 1929 |
| 2,488,328 | Rider | Nov. 15, 1949 |